United States Patent
Lai et al.

(10) Patent No.: US 9,425,980 B2
(45) Date of Patent: Aug. 23, 2016

(54) INTELLIGENT HOUSEHOLD SYSTEM BASED ON CALL CENTRE AND IMPLEMENTATION METHOD THEREOF

(71) Applicant: ZTE Corporation, Shenzhen (CN)

(72) Inventors: Yongsen Lai, Shenzhen (CN); Weiwei Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 4 days.

(21) Appl. No.: 14/426,694

(22) PCT Filed: Jul. 24, 2013

(86) PCT No.: PCT/CN2013/080046
§ 371 (c)(1),
(2) Date: Mar. 6, 2015

(87) PCT Pub. No.: WO2013/174339
PCT Pub. Date: Nov. 28, 2013

(65) Prior Publication Data
US 2015/0236868 A1 Aug. 20, 2015

(30) Foreign Application Priority Data
Sep. 6, 2012 (CN) .......................... 2012 1 0327463

(51) Int. Cl.
*H04M 3/42* (2006.01)
*H04L 12/28* (2006.01)
(Continued)

(52) U.S. Cl.
CPC ...... *H04L 12/2816* (2013.01); *H04M 1/72533* (2013.01); *H04M 3/5183* (2013.01); *H04W 4/14* (2013.01); *H04W 4/18* (2013.01); *H04L 2012/2841* (2013.01)

(58) Field of Classification Search
CPC .............................................. H04N 21/44222
USPC ...................................... 455/414.1
See application file for complete search history.

(56) References Cited

U.S. PATENT DOCUMENTS 7,197,128 B1 * 3/2007 Stumm .................. H04Q 3/005
379/199
2004/0175096 A1 9/2004 Caspi et al.
(Continued)

FOREIGN PATENT DOCUMENTS

CN 2558026 Y 6/2003
CN 1953431 A 4/2007
(Continued)

OTHER PUBLICATIONS

International Search Report issued Oct. 31, 2013 re: Application No. PCT/CN2013/080046; CN 101729553 A, CN 1953431 A, CN 102404413 A, CN 202026319 U, US 2009/0164786 A1.
(Continued)

*Primary Examiner* — Thomas Lett
(74) *Attorney, Agent, or Firm* — Cantor Colburn LLP

(57) ABSTRACT

An intelligent household system based on a call center and an implementation method includes a subscriber registration component which is configured to achieve registration binding of a subscriber number and a home terminal corresponding to the subscriber number. The system further includes a call center which is configured to acquire a subscriber operation command and send the subscriber operation command to the home terminal corresponding to the subscriber number according to a binding relationship between the subscriber number and the home terminal. The system further includes a home terminal which is configured to execute the received subscriber operation command. The intelligent household system based on the call center and the implementation method essentially have no requirements for a subscriber side, monitor an intelligent household device based on a call center, and reduce the use threshold of subscribers.

8 Claims, 1 Drawing Sheet

(51) Int. Cl.
*H04M 3/51* (2006.01)
*H04W 4/14* (2009.01)
*H04M 1/725* (2006.01)
*H04W 4/18* (2009.01)

(56) References Cited

U.S. PATENT DOCUMENTS

| | | | |
|---|---|---|---|
| 2005/0027887 A1* | 2/2005 | Zimler | H04L 12/1814 709/249 |
| 2005/0070255 A1* | 3/2005 | Cass | H04M 3/42 455/414.1 |
| 2006/0147003 A1 | 7/2006 | Archacki, Jr. et al. | |
| 2009/0164786 A1 | 6/2009 | Sekimoto et al. | |
| 2009/0271002 A1 | 10/2009 | Asofsky | |
| 2012/0079507 A1* | 3/2012 | Agarwal | H04L 12/2814 719/321 |
| 2012/0226764 A1* | 9/2012 | Philip | H04L 67/125 709/208 |

FOREIGN PATENT DOCUMENTS

| | | |
|---|---|---|
| CN | 101729553 A | 6/2010 |
| CN | 202026319 U | 11/2011 |
| CN | 102404413 A | 4/2012 |
| EP | 1480433 A2 | 11/2004 |
| KR | 1020090008017 A | 1/2009 |

OTHER PUBLICATIONS

Extended European Search Report issued Nov. 4, 2015 re: Application No. PCT/CN2013/080046; pp. 1-7; US 2004/175096 A1, US 2006/147003 A1, US 2009/271002 A1 and EP 1 480 433 A2.

* cited by examiner

INTELLIGENT HOUSEHOLD SYSTEM BASED ON CALL CENTRE AND IMPLEMENTATION METHOD THEREOF

TECHNICAL FIELD

The disclosure relates to an intelligent household system, including, e.g., an intelligent household system based on a call centre and an implementation method of an intelligent household system based on a call centre.

BACKGROUND

An intelligent household can combine subsystems of, such as security and protection, lighting control, curtain control, gas valve control, information household appliances, scene linkage, floor heating, in home life together by use of advanced computer technology, network communication technology, and comprehensive wiring technology, according to the human body engineering principle and individual needs, and perform comprehensive, intelligent control and management through network, so as to realize people-oriented novel home life experiences.

At present, with rapid development of the Internet of Things, the Internet of Things technology is more and more applied in the household intelligence. The common implementation method for accessing the intelligent household system is to access in a mode of web and intelligent terminal combined with home gateway. However, there is a problem, i.e., during the use, a subscriber needs to install an application program in a fixed computer or portable computer or a portable terminal (e.g., a mobile phone) carried by the subscriber. For example, when a subscriber is away from home, subsystems in an intelligent household can be remotely controlled by the application program installed in a carried mobile phone or in a computer, e.g., the air conditioner and water heater in home can be turned on in advance when the user is on his/her way home, so that it will increase the cost of subscribers, and is not suitable for wide promotion.

SUMMARY

The embodiments of the disclosure mainly provide an intelligent household system based on a call centre and an implementation method of an intelligent household system based on a call centre, so as to reduce the use threshold of subscribers.

To achieve the purpose of the disclosure, the following technical solution is implemented in the embodiments of the disclosure: an intelligent household system based on a call centre is provided, wherein the intelligent household system comprises: a subscriber registration component which is configured to achieve registration binding of a subscriber number and a home terminal corresponding to the subscriber number; the call centre which is configured to acquire a subscriber operation command and send the subscriber operation command to the home terminal corresponding to the subscriber number according to the binding relationship between the subscriber number and the home terminal; and the home terminal which is configured to execute the received subscriber operation command.

According to an embodiment of the disclosure, the subscriber registration component is further configured to set up for a subscriber a voice/video navigation menu file to be called by the call centre.

According to an embodiment of the disclosure, the call centre comprises an automatic service component, a voice/video menu conversion component, a media service component, and an interface control component, wherein the automatic service component is configured to interact with a subscriber terminal, call a corresponding voice/video navigation menu corresponding a navigation menu selection instruction input from the media service component according to the navigation menu selection instruction input by a subscriber, and is further configured to generate the subscriber operation command according to the operation of the subscriber on the voice/video navigation menu and send the generated subscriber operation to the interface control component; the voice/video menu conversion component is configured to interact with the subscriber registration component to convert the voice/video navigation menu file obtained from the subscriber registration component into the voice/video navigation menu; the media service component is configured to store the voice/video navigation menu to be called by the automatic service component; and the interface control component is configured to send the received subscriber operation command to the home terminal corresponding to the subscriber number according to the binding relationship between the subscriber number and the home terminal.

According to an embodiment of the disclosure, the call centre further comprises: a short-message instruction component which is configured to acquire a subscriber operation command sent by the subscriber via a short message and send the subscriber operation command to the interface control component.

According to an embodiment of the disclosure, the call centre further comprises: a manual service agent which is configured, after the subscriber terminal establishes a connection with the automatic service component, to be activated according to the navigation menu selection instruction input by the subscriber, and generate the subscriber operation command according to an operation instruction of the subscriber and then send the subscriber operation command to the interface control component.

According to an embodiment of the disclosure, the home terminal comprises: a control conversion component which is configured to parse the received subscriber operation command to acquire a target subscriber operation command and send the target subscriber operation command to a home routing gateway; the home routing gateway which is configured to forward the target subscriber operation command to a household intelligent device corresponding to the target subscriber operation command according to preset routing information; and the household intelligent device which is configured to execute the target subscriber operation command.

In the embodiments of the disclosure, an implementation method of an intelligent household system based on a call centre is provided, wherein the intelligent household system comprises: a subscriber registration component, the call centre and a home terminal corresponded to a subscriber number, and the method comprises: the subscriber registration component achieving registration binding of the subscriber number and the home terminal; the call centre acquiring a subscriber operation command and sending the subscriber operation command to the home terminal corresponding to the subscriber operation according to the binding relationship between the subscriber number and the home terminal corresponded to the subscriber number; and the home terminal executing the received subscriber operation command.

According to an embodiment of the disclosure, the subscriber registration component is further configured to set up for a subscriber a voice/video navigation menu file to be called by the call centre.

According to an embodiment of the disclosure, the call centre comprises an automatic service component, a voice/video menu conversion component, a media service component, and an interface control component, wherein the automatic service component is configured to interact with a subscriber terminal, call a voice/video navigation menu corresponding a navigation menu selection instruction input from the media service component according to the navigation menu selection instruction input by a subscriber, and is further configured to generate the subscriber operation command according to the operation of the subscriber on the voice/video navigation menu and send the generated subscriber operation command to the interface control component; the voice/video menu conversion component is configured to interact with the subscriber registration component to convert the voice/video navigation menu file obtained from the subscriber registration component into the voice/video navigation menu; the media service component is configured to store the voice/video navigation menu to be called by the automatic service component; and the interface control component is configured to send the received subscriber operation command to the home terminal corresponding to the subscriber number according to the binding relationship between the subscriber number and the home terminal.

According to an embodiment of the disclosure, the call centre further comprises: a short-message instruction component which is configured to acquire a subscriber operation command sent by the subscriber via a short message and send the subscriber operation command to the interface control component.

According to an embodiment of the disclosure, the call centre further comprises: a manual service agent which is configured, after the subscriber terminal establishes a connection with the automatic service component, to be activated according to the navigation menu selection instruction input by the subscriber, and generate the subscriber operation command according to an operation instruction of the subscriber and then send the subscriber operation command to the interface control component.

According to an embodiment of the disclosure, the home terminal comprises: a control conversion component which is configured to parse the received subscriber operation command to acquire a target subscriber operation command and send the target subscriber operation command to a home routing gateway; the home routing gateway which is configured to forward the target subscriber operation command to a household intelligent device corresponding to the target subscriber operation command according to preset routing information; and the household intelligent device which is configured to execute the target subscriber operation command.

Through the above-mentioned technical solution of the disclosure, it can be seen that the intelligent household system based on the call centre and the implementation method thereof provided in the disclosure essentially have no requirements for a subscriber side. An intelligent household device is monitored based on a call centre, thus reducing the use threshold of subscribers, providing a function of compatible accessing of various household intelligent devices, and making full use of the existing networks and devices. For operators, the service level is improved and the volume of service is increased without expanding more costs.

The implementation, functional characteristics and excellent effects of the disclosure will be further described below with reference to the embodiments and drawings.

DESCRIPTION OF EMBODIMENTS

The technical solution of the disclosure is described below with reference to the accompanying drawings and embodiments in detail, so as to enable the skilled personnel in the field to better understand the disclosure and implement; but the embodiments are not intended to limit the disclosure.

Figure 1:
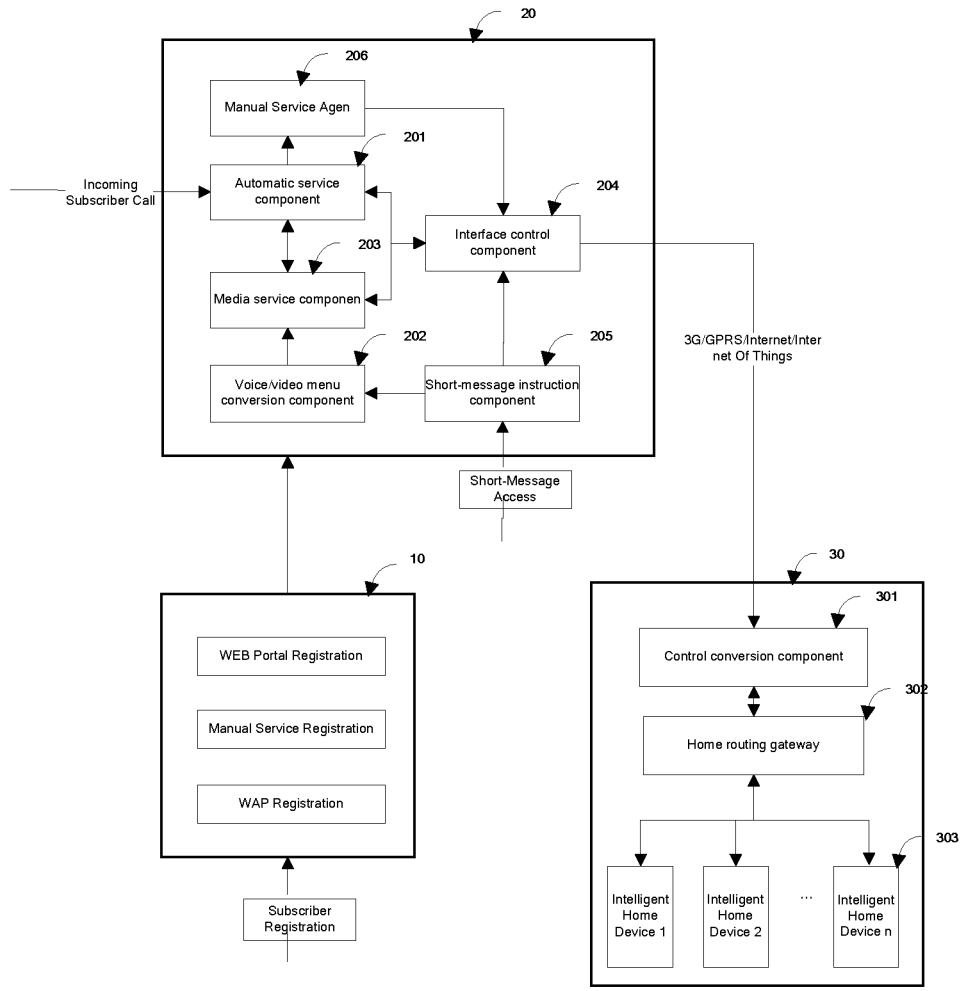
FIG. 1 shows a schematic structural diagram of an intelligent household system based on a call centre provided in an embodiment of the disclosure.

As shown in FIG. 1, an intelligent household system based on a call centre is provided in the embodiment of the disclosure. The intelligent household system essentially has no requirements for a subscriber side and can monitor an intelligent household device based on a call centre, mainly comprising:

a subscriber registration component 10, which is configured to achieve registration binding of a subscriber number and a home terminal corresponding to the subscriber number;

a call centre 20, which is configured to acquire a subscriber operation command and send the subscriber operation command to the home terminal corresponding to the subscriber number according to the binding relationship between the subscriber number and the home terminal; and the home terminal 30, which is configured to execute the received subscriber operation command.

According to an embodiment of the disclosure, the subscriber registration component 10 is further configured to set up for a subscriber a voice/video navigation menu file to be called by the call centre 20. In a practical application, the subscriber may perform registration on the subscriber registration component 10 in a manner of WEB portal registration, manual service registration or WAP registration, so as to achieve registration binding of the subscriber number and the home terminal 30 corresponding to the subscriber number, and to set up the voice/video navigation menu file. During the implementation, a visual editing interface is provided to help the subscriber to create the voice/video navigation menu, store the voice/video navigation menu in a database, and push it to the voice/video menu conversion component of the call centre 20 at the same time.

Preferably, the call centre 20 may comprises an automatic service component 201, a voice/video menu conversion component 202, a media service component 203, and an interface control component 204, wherein the automatic service component 201 is configured to interact with the subscriber terminal, and call the voice/video navigation menu corresponding a navigation menu selection instruction input from the media service component 203 according to the navigation menu selection instruction input by the subscriber, and is configured to generate the subscriber operation command according to the operation of the subscriber on the voice/video navigation menu and send the generated subscriber operation command to the interface control component 204; and during the implementation, it navigate the subscriber according to the voice/video navigation menu which is set up by the subscriber via the subscriber registration component 10, and select different navigation menus according to the navigation menu selection instruction input by the subscriber, so as to perform query and monitor for the home terminal 30, then push the query result as a short message, a multimedia message, or voice to the subscriber, and also initiate a video navigation service and a manual service agent service.

The voice/video menu conversion component 202 is configured to interact with the subscriber registration component 10 so as to convert the voice/video navigation menu file obtained from the subscriber registration component 10 into the voice/video navigation menu;

the media service component 203 is configured to store the voice/video navigation menu to be called by the automatic service component 201; and the interface control component 204 is configured to send the received subscriber operation command to the home terminal 30 corresponding to the subscriber number according to the binding relationship between the subscriber number and the home terminal 30.

In a more preferred embodiment, the call centre 20 may further comprises: a short-message instruction component 205 which is configured to acquire a subscriber operation command which is sent by a subscriber via a short message and send the subscriber operation command to the interface control component 204.

In a more preferred embodiment, the call centre 20 may further comprises: a manual service agent 206 which is configured, after the subscriber terminal establishes a connection with the automatic service component 201, be activated according to the navigation menu selection instruction input by the subscriber, and generate the subscriber operation command according to an operation instruction of the subscriber and then send the subscriber operation command to the interface control component 204.

In this embodiment, except the existing modules such as automatic service component 201, manual service agent, the call centre 20, further comprises a media service component 203, an interface control component 204, a voice/video menu conversion component 202 and a short-message instruction component 205. Various access ways (e.g., GPRS, 3G, INTERNET, and Internet of Things) is can provided, and a personalized voice/video navigation menu is generated through the information registered via the subscriber registration component 10, and the conversion of audio and video files is achieved. When a subscriber call accesses, the automatic service component 201 guide the subscriber to initiate control on the home terminal 30. When the subscriber initiates a short-message control, the short-message instruction component 205 acquires the subscriber operation command and sends it to the interface control component 204, so that the interface control component 204 is able to send the subscriber operation command in time to the home terminal 30 corresponding to the subscriber operation command, so as to achieve the control on the home terminal 30. During the implementation, after completing the control on the household intelligent device, the home terminal 30 may feedback the control result in various expression manners (e.g., video, multimedia message, short message, and voice) to the subscriber, which will not be described below in detail.

Preferably, the home terminal 30 may comprise: a control conversion component 301 which is configured to parse the received subscriber operation command, so as to acquire a target subscriber operation command and send the target subscriber operation command to a home routing gateway 302; the home routing gateway 302 which is configured to forward the target subscriber operation command to a household intelligent device 303 corresponding to the target subscriber operation command according to preset routing information; and the household intelligent device 303 which is configured to execute the target subscriber operation command.

During the implementation, the control conversion component 301 may be designed to be compatible with household intelligent devices 303 from many manufacturers for direct access, so as to achieve sending and receiving of message and the message conversion, and also support access of multiple networks (e.g., GPRS, 3G, INTERNET, and Internet of Things).

Figure 2:
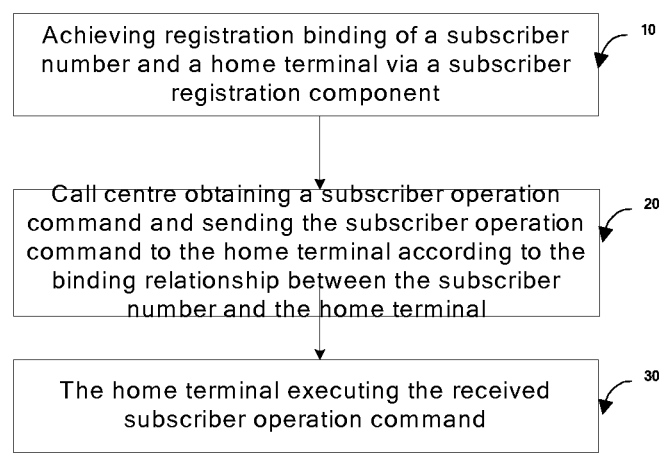
FIG. 2 shows a flowchart of an implementation method of a intelligent household system based on a call centre provided in an embodiment of the disclosure.

As shown in FIG. 2, combined with FIG. 1, an implementation method of an intelligent household system based on the call centre 20 is provided in an embodiment of the disclosure, the intelligent household system comprising a subscriber registration component 10, a call centre 20, and a home terminal 30, the method comprising:

S10, achieving registration binding between a subscriber number and the home terminal 30 corresponding to the subscriber number via the subscriber registration component 10, S20, the call centre 20 acquiring a subscriber operation command and sending the subscriber operation command to the home terminal 30 corresponding to the subscriber operation according to the binding relationship between the subscriber number and the home terminal 30 corresponded to the subscriber number; and S30, the home terminal 30 executing the received subscriber operation command.

During the implementation, for the intelligent household system, the subscriber registration component 10 may further be configured to set up for a subscriber a voice/video navigation menu file to be called by the call centre 20. In a practical application, the subscriber may perform registration on the subscriber registration component 10 in a manner of WEB portal registration, manual service registration or WAP registration, so as to achieve registration binding of the subscriber number and the home terminal 30 corresponding to the subscriber number, and set up the voice/video navigation menu file.

Preferably, for this intelligent household system, the call centre 20 may further comprise an automatic service component 201, a voice/video menu conversion component 202, a media service component 203, and an interface control component 204, wherein the automatic service component 201 is configured to interact with the subscriber terminal, call the voice/video navigation menu corresponding to a navigation menu selection instruction input from the media service component 203 according to the navigation menu selection instruction input by the subscriber, and preferably, is configured to generate the subscriber operation command according to the operation of the subscriber on the voice/video navigation menu and send the generated subscriber operation command to the interface control component 204; and the voice/video menu conversion component 202 is configured to interact with the subscriber registration component 10 so as to convert the voice/video navigation menu file obtained from the subscriber registration component 10 into the voice/video navigation menu;

the media service component 203 is configured to store the voice/video navigation menu which can be called by the automatic service component 201; and the interface control component 204 is configured to send the received subscriber operation command to the home terminal 30 corresponding to the subscriber number according to the binding relationship between the subscriber number and the home terminal 30.

In a more preferred embodiment, for the above-mentioned intelligent household system, the call centre 20 may further comprise:

a short-message instruction component 205 which is configured to acquire a subscriber operation command sent by the subscriber via a short message and send the subscriber operation command to the interface control component 204.

In a more preferred embodiment, for the above-mentioned intelligent household system, the call centre 20 may further comprise:

a manual service agent 206 which is configured to, after the subscriber terminal establishes a connection with the automatic service component 201, be activated according to the navigation menu selection instruction input by the subscriber, and generate the subscriber operation command according to an operation instruction of a subscriber, and then send the subscriber operation command to the interface control component 204.

In this embodiment, except the existing modules such as automatic service component 201, manual service agent, the call centre 20 further comprises a media service component 203, an interface control component 204, a voice/video menu conversion component 202 and a short-message instruction component 205. Various access ways (e.g., GPRS, 3G, INTERNET, and Internet of Things) can be provided, a personalized voice/video navigation menu is generated through the information registered via the subscriber registration component 10, and the conversion of audio and video files is achieved. When a subscriber call accesses, the automatic service component 201 guide the subscriber to initiate control on the home terminal 30. When the subscriber initiates a short-message control, the short-message instruction component 205 acquires the subscriber operation command and sends the subscriber operation command to the interface control component 204, so that the interface control component 204 is able to send the subscriber operation command in time to the home terminal 30, so as to achieve the control on the home terminal 30. During the implementation, after completing the control on the corresponding household intelligent device 303, the home terminal 30 may feedback the control result in various expression manners (e.g., video, multimedia message, short message, and voice) to the subscriber, which will not be described below in detail.

According to an embodiment of the disclosure, for the above-mentioned intelligent household system, the home terminal 30 comprises:

a control conversion component 301 which is configured to parse the received subscriber operation command, to acquire a target subscriber operation command and send the target subscriber operation command to the home routing gateway 302;

a home routing gateway 302 which is configured to forward the target subscriber operation command to the household intelligent device 303 corresponding to the target subscriber operation command according to the preset routing information; and the household intelligent device 303 which is configured to execute the above-mentioned target subscriber operation command During the implementation, the control conversion component 301 may be designed to be compatible with household intelligent devices 303 from many manufacturers for direct access, so as to achieve sending and receiving of message and message conversion, and also support access of multiple networks (e.g., GPRS, 3G, INTERNET, and Internet of Things).

In the embodiments of the disclosure, after the subscriber completes the registration via the subscriber registration component 10, the subscriber calls an access number of the call centre 20, and after accessing the call centre 20, the automatic service component 201 plays the subscriber-defined voice/video navigation menu and guides the subscriber to directly or indirectly (e.g., via the manual service agent 206) achieve the query and the control of the home terminal 30. In the embodiments of the disclosure, after the subscriber completes the registration via the subscriber registration component 10, the subscriber may also directly initiate a short message instruction to the call centre 20, and after processing by the short-message instruction component 205, the interface control component 204 is connected to the home terminal 30 in multiple manners (e.g., GPRS, 3G, INTERNET, and Internet of Things) and initiates query and control commands to the home terminal 30.

During the implementation, the call centre 20 parses, via the interface control component 204, the subscriber operation instruction obtained from the manual service agent 206, the automatic service component 201 or the short-message instruction component 205, allocates service channels (or may be understood as temporary exclusive signaling data transmission channels between the subscriber and the home terminal 30), maintains the allocated service channel state (e.g., running, hang-up, or destruction), and is connected to the home terminal 30 in multiple manners (e.g., GPRS, 3G, INTERNET, and Internet of Things) to initiate query and control commands for the home terminal 30.

During the implementation, the control conversion component 301 of the home terminal 30 receives a subscriber operation command of query and control from the interface control component 204, performs command message conversion, and achieves operations such as query, data acquisition, control, and video signal switch and transmission via the household intelligent device 303 of the home terminal 30, and then returns the operation results in multiple manners (e.g., video, multimedia message, short message, and voice) to the call centre 20, so as to inform the subscriber.

The implementation process of an intelligent household system based on the call centre 20 provided in an embodiment of the disclosure will be described below with reference to FIG. 1.

I. Subscriber registration step:

Step 1: a subscriber performs service registration and acceptance via the subscriber registration component 10, in a manner of WEB, WAP, or manual service, and mobile number or fixed number information, device type information, and subscriber-intended voice/video navigation menu file information of the subscriber terminal are input, stored in database, and pushed to a voice/video conversion module.

Step 2: the voice/video conversion module receives the message sent by the subscriber registration component 10, obtains the data relevant to the subscriber and the device and the voice/video navigation menu file information, converts into a voice/video file required by the automatic service component 201 and the media service component 203, and uploads the converted file at the path specified by the automatic service component 201 and the media service component 203.

II. Process of a subscriber initiating short-message query and control.

Step 1: a subscriber initiates a short message query and control command to the short message access number of the call centre 20 according to certain format, and the short-message instruction component 205 receives the subscriber operation command sent from the subscriber and then sends it to the interface control component 204.

Step 2: the interface control component 204 receives the subscriber operation command sent from the short-message instruction component 205, and then sends the subscriber operation command to the control conversion component 301 of the home terminal 30 corresponding to the subscriber operation command in a manner of 3G/GPRS/INTERNET/Internet of Things.

Step 3: the control conversion component 301 of the home terminal 30 receives the subscriber operation command sent from the interface control component 204, converts and parses it into a message command which can be recognized by the household intelligent device 303, and sends to the home routing gateway 302.

Step 4: the home routing gateway 302 receives the message command sent from the control conversion component 301, and forwards to the household intelligent device 303 via the preset routing fibers.

Step 5: the household intelligent device 303 receives the message command (e.g., query or control command) forwarded by the home routing gateway 302, then achieves operations, such as power management, state management, video switch, and data acquisition, and returns the operation results to the home routing gateway 302.

Step 6: the home routing gateway 302 receives the operation result message, returns a feedback message, and transfers the operation result message to the control conversion component 301.

Step 7: the control conversion component 301 transfers the received operation result message to the interface control component 204 of the call centre 20.

Step 8: the interface control component 204 then returns the operation result message to the short-message instruction component 205.

Step 9: the short-message instruction component 205 receives the operation result message, and then transfers the operation result as a short message to the subscriber.

III. Process of a subscriber initiating voice query and control.

Step 1: a subscriber calls an access number of the call centre 20 to enter an automatic service voice navigation process via the automatic service component 201, and the subscriber selects a key corresponding to the target home terminal 30 according to a voice prompt. If the subscriber selects a voice menu mode, the automatic service component plays a subscriber-defined voice navigation menu according to a subscriber registration number (or an authenticated number), the subscriber selects the home terminal 30 in need of query or control and the corresponding household intelligent device 303 according to the voice prompt, and the selected operation is converted into a subscriber operation command and is sent to interface control component 204.

Step 2: the interface control component 204 receives the subscriber operation command from the automatic service component 201, sends the subscriber operation command message to the control conversion component 301 of the home terminal 30 in a manner of 3G/GPRS/internet/Internet of Things.

Step 3: the control conversion component 301 receives the subscriber operation command sent from the interface control component 204, converts and parses it into a message command which can be recognized by the household intelligent device 303, and sends to the home routing gateway 302.

Step 4: the home routing gateway 302 forwards the message command sent from the control conversion component 301 to the household intelligent device 303 corresponding to the message command according to the preset routing information.

Step 5: the household intelligent device 303 receives the message command (e.g., query or control command) forwarded by the home routing gateway 302, then achieves operations, such as power management, state management, video switch, and data acquisition, and returns the operation results to the home routing gateway 302.

Step 6: the home routing gateway 302 receives the operation result message, returns a message, and then transfers the operation result message to the control conversion component 301.

Step 7: the control conversion component 301 transfers the received operation result message to the interface control component 204 of the call centre 20.

Step 8: the interface control component 204 receives the returned operation result message, and returns the operation result message to the automatic service component 201.

Step 9: the automatic service component 201 receives the operation result message, and feedbacks the operation result to the subscriber in a manner of short message, multimedia message, voice, etc.

IV. Process of a subscriber initiating video query and control.

Step 1: a subscriber calls an access number of the call centre 20 to enter an automatic service voice navigation process, and the subscriber selects a key corresponding to the target home terminal 30 according to a voice prompt. If the subscriber selects a video menu mode, switch to the media service component 203.

Step 2: the media service component 203 establishes a video connection with the subscriber, and play a subscriber-defined video navigation menu according to a subscriber registration number (or an authenticated number), the subscriber selects the household intelligent device 303 of the home terminal 30 in need of query or control according to the video navigation menu, and the media service component 203 converts the selected operation into a subscriber operation command, and then sends to the interface control component 204.

Step 3: the interface control component 204 receives the subscriber operation command from the media service component 203, and sends the subscriber operation command message to the control conversion component 301 of the home terminal 30 in a manner of 3G/GPRS/internet/Internet of Things, etc.

Step 4: the control conversion component 301 receives the subscriber operation command sent from the interface control component 204, converts and parses it into a message command which can be recognized by the household intelligent device 303, and sends to the home routing gateway 302.

Step 5: the home routing gateway 302 forwards the message command sent from the control conversion component 301 to the household intelligent device 303 corresponding to the message command according to the preset routing information.

Step 6: the household intelligent device 303 receives the message command (e.g., query or control command) forwarded by the home routing gateway 302, then achieves corresponding operations, such as power management, state management, video switch, and data acquisition, and returns the operation results to the home routing gateway 302.

Step 7: the home routing gateway 302 receives the operation result, returns a message, and then transfers it to the control conversion component 301.

Step 8: the control conversion component 301 transfers the received operation result message to the interface control component 204 of the call centre 20.

Step 9: the interface control component 204 receives the returned operation result message, and then feedbacks the operation result to the media service component 203.

Step 10: the media service component 203 receives the operation result message, and pushes the operation result to the subscriber in a manner of video, voice, short message, multimedia message, etc.

V. Process of a subscriber initiating manual query and control.

Step 1: a subscriber calls a voice number of the call centre 20 to enter an automatic service voice navigation process, and the subscriber selects manual service according to the voice prompt to enter a manual service agent.

Step 2: after entering the manual service agent, a telephone operator initiates a query and control operation for the target home terminal 30 and the corresponding household intelligent device 303 under the authorization and intention of the subscriber, so as to generate a corresponding subscriber operation command, and sends the subscriber operation command to the interface control component 204.

Step 3: the interface control component 204 receives the subscriber operation command sent from the manual service agent, and sends the subscriber operation command message to the control conversion component 301 of the home terminal 30 in a manner of 3G/GPRS/internet/Internet of Things, etc.

Step 4: the control conversion component 301 receives the subscriber operation command sent from the interface control component 204, converts and parses it into a message command which can be recognized by the household intelligent device 303, and sends to the home routing gateway 302.

Step 5: the home routing gateway 302 forwards the message command sent from the control conversion component 301 to the household intelligent device 303 corresponding to the message command according to the preset routing information.

Step 6: the household intelligent device 303 receives the message command (e.g., query or control command) forwarded by the home routing gateway 302, then achieves operations, such as power management, state management, video switch, and data acquisition, and returns the operation results to the home routing gateway 302.

Step 7: the home routing gateway 302 receives the operation result message, returns a message, and transfers the operation result message to the control conversion component 301.

Step 8: the control conversion component 301 transfers the received operation result message to the interface control component 204 of the call centre 20.

Step 9: the interface control component 204 receives the returned operation result message, and feedbacks the operation result to the automatic service component 201.

Step 10: the automatic service component 201 receives the message, and pushes the operation result to the subscriber in a manner of short message, multimedia message, voice, etc.

The above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. Thus, the disclosure is not limited to any particular combination of hardware and software. Any equivalent replacements of the structure or the flow based on the contents of the specification and drawings of the disclosure, or direct or indirect application of the equivalent replacements in other related technical fields shall fall within the scope of protection of the disclosure.

What is claimed is:
1. An intelligent household system based on a call centre, the intelligent household system comprising:
   a subscriber registration component, configured to achieve registration binding of a subscriber number and a home terminal corresponding to the subscriber number, and set up for a subscriber a voice/video navigation menu file to be called by the call centre;
   the call centre, configured to acquire a subscriber operation command and send the subscriber operation command to the home terminal corresponding to the subscriber number according to a binding relationship between the subscriber number and the home terminal; and
   the home terminal, configured to execute the received subscriber operation command;
   wherein the call centre comprises an automatic service component, a voice/video menu conversion component, a media service component, and an interface control component, wherein
   the automatic service component is configured to interact with a subscriber terminal, call a voice/video navigation menu corresponding a navigation menu selection instruction input from the media service component according to the navigation menu selection instruction input by a subscriber, and is further configured to generate the subscriber operation command according to the operation of the subscriber on the voice/video navigation menu and send the generated subscriber operation command to the interface control component;
   the voice/video menu conversion component is configured to interact with the subscriber registration component to convert the voice/video navigation menu file obtained from the subscriber registration component into the voice/video navigation menu;
   the media service component is configured to store the voice/video navigation menu to be called by the automatic service component; and
   the interface control component is configured to send the received subscriber operation command to the home terminal corresponding to the subscriber number according to the binding relationship between the subscriber number and the home terminal.

2. The intelligent household system based on the call centre according to claim 1, wherein the call centre further comprises:
a short-message instruction component which is configured to acquire a subscriber operation command sent by the subscriber via a short message and send the subscriber operation command to the interface control component.

3. The intelligent household system based on the call centre according to claim 1, wherein the call centre further comprises:
a manual service agent which is configured, after the subscriber terminal establishes a connection with the automatic service component, to be activated according to the navigation menu selection instruction input by the subscriber, generate the subscriber operation command according to an operation instruction of the subscriber, and then send the subscriber operation command to the interface control component.

4. The intelligent household system based on the call centre according to claim 1, wherein the home terminal comprises:
a control conversion component which is configured to parse the received subscriber operation command to acquire a target subscriber operation command and send the target subscriber operation command to a home routing gateway;
the home routing gateway which is configured to forward the target subscriber operation command to a household intelligent device corresponding to the target subscriber operation command according to preset routing information; and
the household intelligent device which is configured to execute the target subscriber operation command.

5. An implementation method of an intelligent household system based on a call centre, wherein the intelligent household system comprises a subscriber registration component, the call centre and a home terminal corresponded to a subscriber number, and the method comprises:
the subscriber registration component achieving registration binding between the subscriber number and the home terminal;
the call centre acquiring a subscriber operation command, and sending the subscriber operation command to the home terminal corresponding to the subscriber operation according to a binding relationship between the subscriber number and the home terminal corresponded to the subscriber number; and
the home terminal executing the received subscriber operation command;
wherein the subscriber registration component further sets up for a subscriber a voice/video navigation menu file to be called by the call centre;
the call centre comprises an automatic service component, a voice/video menu conversion component, a media service component, and an interface control component, wherein the automatic service component interacts with a subscriber terminal, call a voice/video navigation menu corresponding to a navigation menu selection instruction input from the media service component according to the navigation menu selection instruction input by a subscriber, and is configured to generate the subscriber operation command according to the operation of the subscriber on the voice/video navigation menu and send the generated subscriber operation command to the interface control component;
the voice/video menu conversion component interacts with the subscriber registration component to convert the voice/video navigation menu file obtained from the subscriber registration component into the voice/video navigation menu;
the media service component stores the voice/video navigation menu to be called by the automatic service component; and
the interface control component sends the received subscriber operation command to the home terminal corresponding to the subscriber number according to the binding relationship between the subscriber number and the home terminal.

6. The implementation method of the intelligent household system based on the call centre according to claim 5, wherein the call centre further comprises:
a short-message instruction component which is configured to acquire a subscriber operation command sent by the subscriber via a short message and send the subscriber operation command to the interface control component.

7. The implementation method of the intelligent household system based on the call centre according to claim 5, wherein the call centre further comprises:
a manual service agent which is configured, after the subscriber terminal establishes a connection with the automatic service component, to be activated according to the navigation menu selection instruction input by the subscriber, generate the subscriber operation command according to an operation instruction of the subscriber, and then send the subscriber operation command to the interface control component.

8. The implementation method of the intelligent household system based on the call centre according to claim 5, wherein the home terminal comprises:
a control conversion component which is configured to parse the received subscriber operation command to acquire a target subscriber operation command and send the target subscriber operation command to a home routing gateway;
the home routing gateway which is configured to forward the target subscriber operation command to a household intelligent device corresponding to the target subscriber operation command according to preset routing information; and
the household intelligent device which is configured to execute the target subscriber operation command.

\* \* \* \* \*